UNITED STATES PATENT OFFICE.

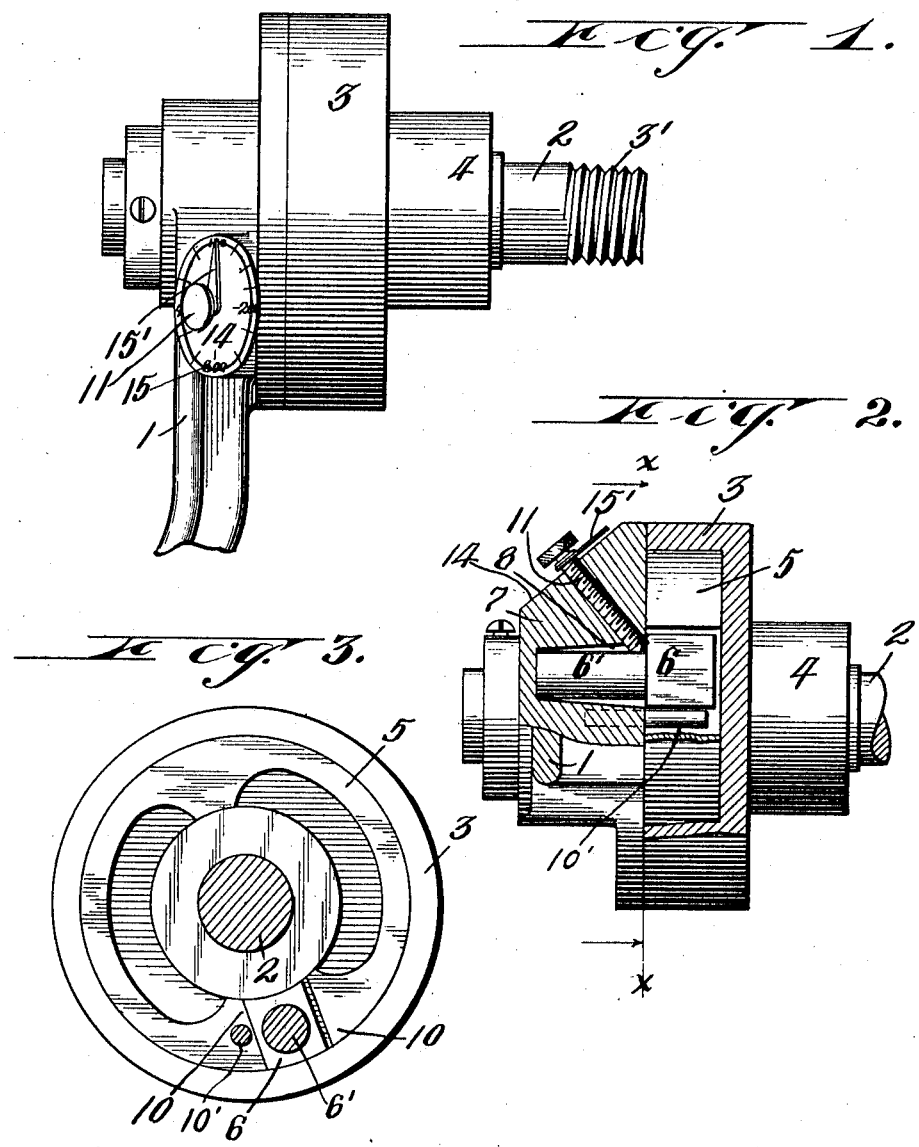

WILLIAM C. HARTMANN, OF MILWAUKEE, WISCONSIN, ASSIGNOR TO MILWAUKEE SEPARATOR COMPANY, OF MILWAUKEE, WISCONSIN, A CORPORATION.

STARTING DEVICE FOR EXPLOSIVE-ENGINES.

1,026,314. Specification of Letters Patent. Patented May 14, 1912.

Application filed January 13, 1911. Serial No. 602,435.

*To all whom it may concern:*

Be it known that I, WILLIAM C. HARTMANN, a citizen of the United States, residing at Milwaukee, county of Milwaukee, and State of Wisconsin, have invented new and useful Improvements in Starting Devices for Explosive-Engines, of which the following is a specification.

The object of my invention is to provide a device for releasing the crank from the driving shaft of an automobile in case of so called back firing within the automobile engine, whereby the liability of the operator being injured by a reverse movement of the crank, is prevented.

My invention is explained by reference to the accompanying drawings, in which—

Figure 1 represents a side view thereof. Fig. 2 is also a side view, part broken away, to show the interior, and Fig. 3 is a transverse section, drawn on line $x$—$x$ of Fig. 2.

Like parts are identified by the same reference numerals throughout the several views.

1 is a driving crank by which the engine is started.

2 is the driving shaft which may, if desired, form an integral part of the driving shaft of the engine, but the same is preferably provided with a screw thread 3', by which it is adapted to be coupled to the end of such driving shaft.

3 is a collar, which is rigidly connected with the shaft 2 through the hub 4. The collar 3 is provided with a split ring 5, and the same is adapted, when expanded, to impinge against the inner walls of the collar 3, whereby motion is communicated from the crank 1 through the split ring to said collar 3, and from thence to the shaft 2. The split ring 5 is expanded and caused to impinge against the inner walls of the collar 3, by the action of the angular member 6 and integrally formed lever 6', and the lever 6' is carried by the hub 7 in the socket 8. Thus when the crank is moved in one direction, the angular member 6 is turned a partial revolution between the opposing ends 10, 10, of the split ring, whereby the split ring is expanded and caused to impinge against the opposing walls of the collar 3, and whereby the collar 3 and shaft 2 are caused to rotate together. When, however, the crank 1 is revolved in the opposite direction, the lever 6' is moved by the socket parallel with the sides of the split ring whereby said lever 6' is brought into contact with and stopped by said pin 10' and prevented thereby from expanding such split ring and consequently the angular member and split ring will move freely within the collar 3 without communicating motion to it.

Some of the elements of the above described combination are shown and described in my pending application, Serial Number 555906, for improvements in clutch mechanism for cream separators, which was filed April 16, 1910.

The novelty of the present improvement pertains more especially among other things to the device for regulating movement of the lever 6' and its action in releasing the split ring from the inclosing collar in case a reverse movement is produced, by back firing. To accomplish such object, I have provided the hub 7 with an adjustable screw 11, which has threaded bearings in said hub and is adapted to impinge at its inner end against the side of the members 6 and 6', whereby the binding action of the angular member 6 against the opposing ends of the split ring 5 is limited and controlled. For example, the screw 11 may be so set that the expansion ring will be forced against the inclosing collar and the required friction will be produced between such parts to drive the shaft with the necessary power for ordinary purposes for starting the engine. When, however, the shaft is caused by back firing to turn in the opposite direction, the friction of the split ring will not be sufficient to carry the crank against such greater resistance, and consequently the shaft will be free to revolve without revolving the crank. In other words, the split ring will let go its impinging grip upon the collar 3 in case the resistance exceeds the normal pull applied to the crank in starting the engine, while the screw 11 is so set that it will drive the shaft with the required power for ordinary purposes.

In order to make the device safe, it is necessary to produce a nice and accurate adjustment of the screw 11 and to accomplish this object, I have provided the dial 14 upon which is printed a plurality of index characters 15 and a pointer 15' is attached to the upper end of the screw 11, by which, as the screw is turned upwardly and downwardly in its threaded bearings, the proper adjustment will be indicated by the pointer, while said pointer will serve as a lever for turning the screw.

By referring to Fig. 2 of the drawings, it will be seen that the angular member 6 is interposed between the opposing ends of the split ring 5, and that consequently, as the lever 6' which is formed integrally with the member 6, is inclined in one direction by the action of the collar 7, it has a tendency to expand the split ring and force it against the opposing wall of the collar 3. When, however, said lever 6' is inclined in the opposite direction by the action of said collar 7, the angular member 6 will be brought in contact with the pin 10', and stopped without expanding said split ring, whereby the shaft is free to be revolved without expanding said split ring and without revolving the crank.

Having thus described my invention, what I claim as new, and desire to secure by Letters Patent, is—

1. In a starting device for explosive engines, the combination of a shaft, a collar rigidly affixed to said shaft, an expansion ring slidably supported within said collar, a hub revolubly supported on said shaft, a crank attached to said hub, a lever supported in an aperture provided therefor in said hub, an angular member formed integrally with said lever between the opposing ends of said expansion ring, and a screw having threaded bearings in said hub, adapted to bear at its inner end against said angular member and thereby limit and control the action of said member and expansion ring.

2. In a starting device for explosive engines, the combination of a shaft, a collar rigidly affixed to said shaft, an expansion ring slidably supported within said collar, a hub revolubly supported on said shaft, a crank attached to said hub, a lever supported in an aperture provided therefor in said hub, an angular member formed integrally with said lever between the opposing ends of said expansion ring, a screw having threaded bearings in said hub, adapted to bear at its inner end against said angular member and thereby limit and control the action of said member and expansion ring, an index dial located on said hub around the protruding end of said screw, and a pointer carried by said screw over the face of said dial.

3. In a starting device for explosive engines, the combination of a shaft, a collar rigidly affixed to said shaft, means for coupling said shaft to the shaft of an engine, an expansion ring slidably supported within said collar, a hub revolubly supported on said shaft, a crank attached to said hub, a lever supported in an aperture provided therefor in said hub, an angular member carried by said lever between the opposing ends of said expansion ring, a screw having threaded bearings in said hub, adapted to bear at its inner end against said angular member and thereby limit and control the action of said member and expansion ring, an index dial located on said hub around the protruding end of said screw, and a pointer carried by said screw over the face of said dial.

In testimony whereof I affix my signature in the presence of two witnesses.

WILLIAM C. HARTMANN.

Witnesses:
Jas. B. Erwin,
H. C. Van Ryn.

---

Copies of this patent may be obtained for five cents each, by addressing the "Commissioner of Patents, Washington, D. C."